US006440532B1

(12) United States Patent
Ogawa et al.

(10) Patent No.: US 6,440,532 B1
(45) Date of Patent: Aug. 27, 2002

(54) BIAXIALLY ORIENTED POLYESTER FILM, PROCESS FOR PRODUCING THE SAME, AND USE THEREOF AS SUBSTRATE FOR PHOTOGRAPHIC SENSITIVE MATERIAL

(75) Inventors: Tatsuya Ogawa; Masayuki Fukuda; Toshifumi Ishikawa, all of Sagamihara; Susumu Taguchi, Gifu, all of (JP)

(73) Assignee: Teijin Limited, Osaka (JP)

( * ) Notice: Subject to any disclaimer, the term of this patent is extended or adjusted under 35 U.S.C. 154(b) by 0 days.

(21) Appl. No.: 09/763,755

(22) PCT Filed: Jun. 23, 2000

(86) PCT No.: PCT/JP00/04139

§ 371 (c)(1),
(2), (4) Date: Feb. 27, 2001

(87) PCT Pub. No.: WO01/00389

PCT Pub. Date: Jan. 4, 2001

(30) Foreign Application Priority Data

| | | |
|---|---|---|
| Jun. 28, 1999 | (JP) | 11-181867 |
| Jan. 5, 2000 | (JP) | 2000-000274 |
| Jan. 5, 2000 | (JP) | 2000-000273 |
| Jan. 6, 2000 | (JP) | 2000-000773 |
| Jan. 6, 2000 | (JP) | 2000-000772 |

(51) Int. Cl.[7] .......................... B32B 27/16; B32B 27/36; B32B 33/00

(52) U.S. Cl. ................. 428/141; 428/480; 428/694 ST; 428/694 SG; 428/910; 528/308; 528/308.1; 264/288.4; 264/289.6; 264/290.2; 430/523; 430/531; 430/533

(58) Field of Search ................................ 428/141, 480, 428/694 ST, 694 SG, 910; 528/308, 308.1; 430/523, 531, 533; 264/288.4, 289.6, 290.2

(56) References Cited

U.S. PATENT DOCUMENTS 5,914,220 A 6/1999 Murayama

FOREIGN PATENT DOCUMENTS

| | | |
|---|---|---|
| JP | 3-161319 | 7/1991 |
| JP | 8-201980 | 8/1996 |
| JP | 10-10677 | 1/1998 |

OTHER PUBLICATIONS

"Book of Particle Size Measurement Technology", Grain Size Measuring Technology, Nikkan Kogyo Press, pp. 242–247, 1975.

*Primary Examiner*—Vivian Chen
(74) *Attorney, Agent, or Firm*—Sughrue Mion, PLLC

(57) ABSTRACT

A biaxially oriented polyester film whose thermal shrinkage factors satisfy relationships represented by the following expressions (1) to (5) at the same time when it is heated at 120° C. for 20 seconds:

$$0.001 \leqq S_{MD} \leqq 0.1 \quad (1)$$

$$-0.1 \leqq S_{TD} \leqq 0.1 \quad (2)$$

$$-0.05 \leqq S_{45} \leqq 0.05 \quad (3)$$

$$-0.05 \leqq S_{135} \leqq 0.05 \quad (4)$$

$$|S_{45} - S_{135}| \leqq 0.05 \quad (5)$$

wherein $S_{MD}$ is a thermal shrinkage factor (%) in machine direction of the film under the above conditions, $S_{TD}$ is a thermal shrinkage factor (%) in a direction perpendicular to that direction under the above conditions, and $S_{45}$ and $S_{135}$ are thermal shrinkage factors (%) in a 45° direction and a direction perpendicular to the 45° direction under the above conditions when the machine direction of the film is 0° and a direction perpendicular to that direction is 90°, respectively, and a production method thereof.

21 Claims, No Drawings

BIAXIALLY ORIENTED POLYESTER FILM, PROCESS FOR PRODUCING THE SAME, AND USE THEREOF AS SUBSTRATE FOR PHOTOGRAPHIC SENSITIVE MATERIAL

FIELD OF THE INVENTION

The present invention relates to a biaxially oriented polyester film having small thermal shrinkage, production method thereof and use thereof as a base film for photosensitive materials. More specifically, it relates to a biaxially oriented polyester film which has high superposition accuracy and excellent transparency, slipperiness and winding properties when it is used as a base film for a photosensitive material of a thermal development system, production method thereof and use thereof as the above base film.

DESCRIPTION OF THE PRIOR ART

Polyester films typified by a polyethylene terephthalate film have been widely used as a base film for photosensitive films. In recent years, a thermal development system characterized by a short development time and easy operation has been frequently used to develop photosensitive films in place of the conventional wet development system. In this thermal development system in which a photosensitive film is developed at a temperature of 80 to 150° C. in most cases, a photosensitive material receives higher heat history than the conventional wet development system. Therefore, a dimensional change caused by thermal shrinkage and the like of the photosensitive material is larger than in the conventional wet development system, causing a problem to be solved for practical application.

To cope with this problem, there is proposed a method for obtaining an image free from a color drift by reducing the dislocation of each film when red, green, blue and black films are placed one upon another to be developed so as to make a plate by reducing the thermal shrinkage factor of a photosensitive material at a thermal development temperature. JP-A 10-10677 (the term "JP-A" as used herein means an "unexamined published Japanese patent application") proposes a photosensitive material which has a thermal dimensional change in longitudinal and transverse directions of 0.04% or less when it is heated at 120° C. for 30 seconds. However, even when the above low thermal shrink film is used, sometimes there arises such a problem as insufficient superposition accuracy. A solution to this problem is awaited.

SUMMARY OF THE INVENTION

It is an object of the present invention to provide a biaxially oriented polyester film which has solved the above problem of the prior art and always has high superposition accuracy and excellent transparency, slipperiness and winding properties.

It is another object of the present invention to provide a method of producing the biaxially oriented polyester film of the present invention.

It is still another object of the present invention to provide use of the biaxially oriented polyester film as a base film for photosensitive materials.

Other objects and advantages of the present invention will become apparent from the following description.

Firstly, according to the present invention, the above objects and advantages of the present invention are attained by a biaxially oriented polyester film whose thermal shrinkage factors satisfy relationships represented by the following expressions (1) to (5) at the same time when it is heated at 120° C. for 20 seconds:

$$0.001 \leqq S_{MD} \leqq 0.1 \quad (1)$$

$$-0.1 \leqq S_{TD} \leqq 0.1 \quad (2)$$

$$-0.05 \leqq S_{45} \leqq 0.05 \quad (3)$$

$$-0.05 \leqq S_{135} 0.05 \quad (4)$$

$$|S_{45} - S_{135}| \leqq 0.05 \quad (5)$$

wherein $S_{MD}$ is a thermal shrinkage factor (%) in machine direction of the film under the above conditions, $S_{TD}$ is a thermal shrinkage factor (%) in a direction perpendicular to that direction under the above conditions, and $S_{45}$ and $S_{135}$ are thermal shrinkage factors (%) in a 45° direction and a direction perpendicular to the 45° direction under the above conditions when the mechanical axial direction of the film is 0° and a direction perpendicular to that direction is 90°, respectively.

Secondly, according to the present invention, the above objects and advantages of the present invention are attained by a method of producing a biaxially oriented polyester film which satisfies all the above expressions (1) to (5) by thermally relaxing at least once a biaxially oriented polyester film whose thermal shrinkage factors do not satisfy at least one of the above expressions when the film is heated at 120° C. for 20 seconds while it is suspended.

Thirdly, according to the present invention, the above objects and advantages of the present invention are attained by a base film for photosensitive materials which comprises the biaxially oriented polyester film of the present invention.

The present invention will be described in detail hereinafter.

Polyester

The polyester forming the polyester film of the present invention is a thermoplastic polyester which comprises a dicarboxylic acid component and a glycol component as the main ingredients. For example, the polyester is preferably a homopolyester or copolyester which comprises an aromatic dicarboxylic acid component such as terephthalic acid, isophthalic acid, 2,6-naphthalenedicarboxylic acid or 4,4'-diphenyldicarboxylic acid and a glycol component such as ethylene glycol, 1,4-butanediol, 1,4-cyclohexane dimethanol or 1,6-hexanediol. Out of these, polyethylene terephthalate and polyethylene-2,6-naphthalene dicarboxylate are particularly preferred.

When the polyester is polyethylene terephthalate, the lower limit of intrinsic viscosity (measured at 35° C. in an orthochlorophenol solution, unit: dl/g) is preferably 0.52, particularly preferably 0.57. When the intrinsic viscosity is 0.52 or more, particularly 0.57 or more, the tear strength of the polyester film becomes high. The upper limit of intrinsic viscosity is preferably 1.50, particularly preferably 1.00. When the intrinsic viscosity is 1.50 or less, particularly 1.00 or less, productivity in the raw material production step and productivity in the film formation step become high. The polyester may be a homopolymer which substantially consists of ethylene terephthalate as the only recurring structural unit or a polyethylene terephthalate copolymer which comprises other components in a total amount of 10% or less, preferably 5% or less based on the total number of all the recurring structural units. Further, the polyester may be a mixture of polyethylene terephthalate and another polyester.

When the polyester is polyethylene-2,6-naphthalene dicarboxylate, the lower limit of intrinsic viscosity is preferably 0.40, particularly preferably 0.50. When the intrinsic viscosity is 0.40 or more, particularly 0.50 or more, the breakage of the film rarely occurs in the step of forming a polyester film. The upper limit of intrinsic viscosity is preferably 0.90, particularly preferably 0.80. When the intrinsic viscosity is 0.90 or less, particularly 0.80 or less, productivity in the raw material production step and productivity in the film formation step become high. The polyester may be a homopolymer which substantially consists of ethylene-2,6-naphthalene dicarboxylate as the only recurring structural unit or a polyethylene-2,6-naphthalene dicarboxylate copolymer which comprises other components in a total amount of 10% or less, preferably 5% or less based on the total number of all the recurring structural units. Further, the polyester may be a mixture of polyethylene-2,6-naphthalene dicarboxylate and another polyester.

The polyester used in the present invention is not limited by its production method. Preferred examples of the production method are one in which an esterification reaction is carried out between terephthalic acid or 2,6-naphthalenedicarboxylic acid and ethylene glycol and then the polycondensation reaction of the obtained reaction product is carried out until the targeted degree of polymerization is achieved to obtain a polyester such as polyethylene terephthalate or polyethylene-2,6-naphthalene dicarboxylate (direct polymerization method) and one in which an ester exchange reaction is carried out between an ester forming derivative of terephthalic acid or 2,6-naphthalenedicarboxylic acid (for example, a lower alkyl ester such as dimethyl ester) and ethylene glycol in accordance with a known method and then the polycondensation reaction of the obtained reaction product is carried out until the targeted degree of polymerization is achieved to obtain a polyester such as polyethylene terephthalate or polyethylene-2,6-naphthalene dicarboxylate (ester exchange method).

The polyester such as polyethylene terephthalate or polyethylene-2,6-naphthalene dicarboxylate obtained by the above direct polymerization method or ester exchange method (both may be referred to as "melt polymerization" hereinafter) may be changed into a polymer having a higher degree of polymerization by a solid-phase (may be referred to as "solid-phase polymerization" hereinafter) as required.

The above ester exchange reaction is generally carried out in the presence of an ester exchange reaction catalyst. The ester exchange reaction catalyst is preferably a manganese compound. The manganese compound is an oxide, chloride, carbonate or carboxylate of manganese. Out of these, manganese acetates are preferred.

In the ester exchange reaction, a phosphorus compound is preferably added when the reaction substantially ends to deactivate the ester exchange catalyst. Examples of the phosphorus compound include trimethyl phosphate, triethyl phosphate, tri-n-butyl phosphate, phosphoric acid and phosphorous acid. Out of these, trimethyl phosphate is preferred.

The catalyst used in:the polycondensation reaction is preferably an antimony compound (Sb compound), titanium compound (Ti compound) or germanium compound (Ge compound). The antimony compound is particularly preferably antimony trioxide. The germanium compound is preferably germanium dioxide, particularly preferably amorphous germanium dioxide having no crystal form because the amount of particles which separate out in the polymer can be reduced.

The polyester may contain additives such as an antioxidant, thermal stabilizer, viscosity modifier, plasticizer, color modifier, lubricant and nucleating agent as required.

Additive Fine Particles

Lubricant fine particles are preferably added to the polyester of the present invention to improve the workability (slipperiness) of a polyester film. Inorganic lubricants as the lubricant fine particles include silica, alumina, titanium dioxide, calcium carbonate and barium sulfate. Organic lubricants include silicone resin particles and crosslinked polystyrene particles. Out of these, porous silica particles which are agglomerates of primary particles are particularly preferred because voids are hardly formed around particles at the time of stretching a film, thereby making it possible to improve the transparency of the film.

The average particle diameter of the primary particles forming the porous silica particles is preferably in the range of 0.001 to 0.1 μm. When the average particle diameter of the primary particles is smaller than 0.001 μm, extremely fine particles are formed by the cracking of the particles at the time of preparing a slurry of particles and form agglomerates which may cause a reduction in transparency. When the average particle diameter of the primary particles is larger than 0.1 μm, the porosity of particles is lost with the result that the characteristic feature that voids are rarely formed may be lost.

The porous silica particles or other lubricant particles may be generally added to a reaction system at any time during the production of the polyester, for example, an ester exchange reaction or polycondensation reaction, preferably as a slurry in a glycol. The porous silica particles are particularly preferably added to the reaction system in the early stage of the polycondensation reaction, for example, before the intrinsic viscosity becomes about 0.3.

Polyester Film

The thermal shrinkage factors of the biaxially oriented polyester film of the present invention satisfy relationships represented by the following expressions (1) to (5) at the same time when it is heated at 120° C. for 20 seconds.

$$0.001 \leqq S_{MD} \leqq 0.1 \quad (1)$$

$$-0.1 \leqq S_{TD} \leqq 0.1 \quad (2)$$

$$-0.05 \leqq S_{45} \leqq 0.05 \quad (3)$$

$$-0.05 \leqq S_{135} \leqq 0.05 \quad (4)$$

$$|S_{45} - S_{135}| \leqq 0.05 \quad (5)$$

In the above expressions, $S_{MD}$ is a thermal shrinkage factor (%) in a machine direction of the film under the above conditions, $S_{TD}$ is a thermal shrinkage factor (%) in a direction perpendicular to that direction under the above conditions, and $S_{45}$ and $S_{135}$ are thermal shrinkage factors (%) in a 45° direction and a direction perpendicular to the 45° direction under the above conditions when the machine direction of the film is 0° and a direction perpendicular to that direction is 90°, respectively.

The above expression (1) indicates that the thermal shrinkage factor ($S_{MD}$) in the machine direction of the film when it is heated at 120° C. for 20 seconds is 0.001% or more and 0.1% or less. When the thermal shrinkage factor in the machine direction is larger than 0.1%, a color drift and image distortion may occur at the time of plate making. It is difficult to achieve a thermal shrinkage factor in the machine direction of less than 0.001%. If the thermal shrinkage factor is forcedly controlled to less than 0.001%, the film may be wrinkled with the result of deteriorated flatness.

The above expression (2) indicates that the thermal shrinkage factor ($S_{TD}$) in the direction perpendicular to the mechanical axis when the film is heated at 120° C. for 20 seconds is −0.1% or more and 0.1% or less. When the thermal shrinkage factor in this direction is outside the above range, such problems as a color drift and image distortion may occur at the time of plate making. The symbol "−" means elongation. Therefore, "−0.1%" means 0.1% elongation.

The above expressions (3) and (4) signify that the thermal shrinkage factor ($S_{45}$) in the 45° direction and the thermal shrinkage factor ($S_{135}$) in the 135° direction when the film is heated at 120° C. for 20 seconds are −0.05% or more and 0.05% or less. When the thermal shrinkage factors ($S_{45}$, $S_{135}$) in the 45° direction and the 135° direction perpendicular to that direction (may be referred to as "oblique direction" hereinafter) are outside the above range, such problems as a color drift and image distortion occur at the time of plate making.

The above expression (5) signifies that the absolute value of difference between the thermal shrinkage factors $S_{45}$ and $S_{135}$ is 0.05% or less. When this value is larger than 0.05%, a color drift and image distortion occur at the time of plate making.

The biaxially oriented polyester film of the present invention must satisfy all of the above requirements at the same time and must not fail to satisfy even one of them.

The thermal shrinkage factor in the oblique direction seems to fall within the above range by itself if thermal shrinkage in the machine direction and thermal shrinkage in a direction perpendicular to that direction are controlled. As a matter of fact, it does not always fall within the above range. A portion where the thermal shrinkage factor in the oblique direction is larger than the thermal shrinkage factors in the machine direction and a direction perpendicular to that direction is near both ends in the above perpendicular direction when a biaxially oriented polyester film is produced. In this portion, the orientation axis is existent almost in the 45° direction (an opposite end portion is around in the 135° direction) and the degree of molecular orientation tends to be markedly large in the direction of the orientation axis. Therefore, the thermal shrinkage factor in the direction of the orientation axis is large, the thermal shrinkage factor in a direction perpendicular to that direction is small, and the film rather elongates in most cases. Thus, there is a case where even when thermal shrinkage in the machine direction and thermal shrinkage in a direction perpendicular to that direction are small, the thermal shrinkage factor in the oblique direction is large. When a film having a large thermal shrinkage factor in the oblique direction is used as a base film for a photosensitive material, such a problem as a reduction in superposition accuracy arises when the film is developed by a thermal development system.

Orientation anisotropy in portions near both ends in the above perpendicular direction is an unique phenomenon seen in sequential stretching and heat setting under tension which are employed to produce a biaxially oriented polyester film and can be reduced to a relatively low level by setting conditions alone but cannot be completely eliminated. Therefore, a low thermal shrinkage factor within the range of the present invention can hardly be obtained without some post-treatment.

Preferably, the biaxially oriented polyester film of the present invention shrinks by 0 to 0.4% in the machine direction and elongates by 0 to 0.2% in a direction perpendicular to that direction when it is heated at 150° C. for 30 minutes.

When the polyester film is used as a base film for a photosensitive film, the development temperature is generally 80 to 150° C. in the thermal development system. It is important that the size of the film should be stable especially at a high temperature, that is, 150° C.

If a film which has a thermal shrinkage factor in the machine direction of more than 0.4% when it is heated at 150° C. for 30 minutes is used as a base film for a photosensitive film, a color drift and image distortion may occur at the time of plate making. It is difficult to control the thermal shrinkage factor in the machine direction to less than 0%. If the thermal shrinkage factor is forcedly controlled to less than 0%, the film will be wrinkled with the result of deteriorated flatness.

If the thermal elongation factor in a direction perpendicular to the machine direction of the film is outside a range of 0 to 0.2% when it is heated at 150° C. for 30 minutes, the flatness of the film will deteriorate. Particularly in the case of shrinkage behavior, that is, a thermal elongation factor of less than 0%, the flatness of the film drastically deteriorates, thereby causing such problems as a color drift and image distortion at the time of plate making when it is used as a base film for a photosensitive film.

As described above, when the film is heated at 150° C. for 30 minutes, the polyester film of the present invention preferably shrinks in the machine direction and elongates in a direction perpendicular to that direction. Vertical wrinkles which are easily formed in the machine direction at the time of thermal relaxation are alleviated by the elongation of the film in a direction perpendicular to the above direction due to these shrinkage and elongation behaviors, whereby flatness is ensured.

Preferably, the biaxially oriented polyester film of the present invention has a thermal shrinkage factor in the machine direction under the above conditions of 0.001 to 0.2% and a thermal shrinkage factor in a direction perpendicular to that direction under the above conditions of −0.1 to 0.1% when the temperature is raised from 30° C. to 120° C. at a rate of 3° C./min.

If the thermal shrinkage factor in the machine direction is larger than 0.2% when the temperature is raised from 30° C. to 120° C. at a rate of 3° C./min, a color drift and image distortion may occur at the time of plate making. It is difficult to achieve a thermal shrinkage factor of less than 0.001% in a direction perpendicular to the above direction. If the thermal shrinkage factor is forcedly controlled to less than 0.001%, the film will be wrinkled with the result of deteriorated flatness.

If the thermal shrinkage factor in the direction perpendicular to the machine direction is outside a range of −0.1% or more and 0.1% or less when the temperature is raised under the same conditions, the film will be inferior in flatness and such problems as a color drift and image distortion will occur at the time of plate making.

Film Thickness

Preferably, the polyester film of the present invention has a thickness of 50 μm or more and 200 μm or less. When the thickness is larger than 200 μm, transparency lowers and economical efficiency becomes low. When the thickness is smaller than 50 μm, strength, especially stiffness, becomes unsatisfactory and plate making work efficiency lowers if the film is used for a photosensitive material. At the time of suspension type thermal relaxation, the running of the film becomes instable by the influence of an air stream.

Haze Value

The haze value of the biaxially oriented polyester film of the present invention is preferably 5% or less, more preferably 4% or less, particularly preferably 2 to 0.3%. When the haze value is larger than 5% and the film is used for a photosensitive material, the sharpness of an image worsens disadvantageously. It is difficult to control the haze value to less than 0.3%.

Surface Roughness Ra

At least one side of the biaxially oriented polyester film of the present invention has a surface roughness (Ra) of 3 nm or more and 15 nm or less. When the surface roughness is smaller than 3 nm, the friction coefficient becomes too large, work efficiency lowers and the film is easily scratched. When the surface roughness is larger than 15 nm, the haze value becomes large and the sharpness of an image deteriorates if the film is used for a photosensitive material.

Dynamic Friction Coefficient

The dynamic friction coefficient of the biaxially oriented polyester film of the present invention is preferably 0.5 or less, more preferably 0.4 or less. The lower limit of dynamic friction coefficient is preferably as close to 0 as possible but particularly preferably 0.3. When the dynamic friction coefficient is larger than 0.5, transferability, work efficiency and winding properties are impaired disadvantageously. A small dynamic friction coefficient is preferred but a dynamic friction coefficient of less than 0.3 is obtained by increasing surface roughness with the result that the haze value becomes large.

Amount of Curvature

When the film is slit to a small width and placed on a plane without applying tension to ensure that it is not wrinkled, a center portion in a transverse direction of the film is almost straight and end portions of the film easily curve. When deviation from the straight line per 1 m in length is taken as the amount of curvature, the amount of curvature of the film is preferably 10 mm or less, particularly preferably 5 mm or less per 1 m. When the amount of curvature is larger than 5 mm, especially larger than 10 mm, the film moves in a zigzag direction at the time of applying a photosensitive agent for photo film with the result that the film may become defective.

Film Formation Method

The biaxially oriented polyester film of the present invention can be produced by thermally relaxing at least once a biaxially oriented polyester film whose thermal shrinkage factors do not satisfy at least one of the above expressions (1) to (5) when it is heated at 120° C. for 20 seconds while it is suspended as described above.

The above biaxially oriented polyester film used in the thermal relaxation can be produced by a conventionally known method. For example, the biaxially oriented polyester film can be produced by drying, melt extruding, biaxially orienting and heat setting a polyester containing lubricant fine particles. In this method, a molten polyester extruded from a T die is solidified by quenching on a cooling drum to obtain an unstretched film which is then stretched to 2.5 to 4 times in machine direction at 70 to 140° C. and then to 3 to 6 times in a direction perpendicular to that direction at 80 to 150° C. and heat set at 190 to 250° C. to obtain a biaxially oriented polyester film. Optionally, an adhesive or slippery film having a thickness of 0.01 to 0.2 $\mu$m may be formed by coating a water-dispersible coating on one side or both sides of the film during the above process after it is stretched in the mechanical axial direction.

Film forming conditions are not particularly limited but such conditions that lighten anisotropy in both end portions of the film and ensure extremely low thermal shrinkage factors and excellent flatness are desirably selected. It is difficult to satisfy all of them but relatively desirable conditions are as follows.

The draw ratio in the machine direction is preferably 2.5 to 4.0 times. The lower limit of draw ratio in the machine direction is more preferably 3.0 times and the upper limit is more preferably 3.6 times. When the draw ratio in the mechanical axial direction is less than 2.5 times, thickness nonuniformity may worsen. When the draw ratio is larger than 4.0 times, orientation in the machine direction becomes strong and the residual stress in the machine direction becomes large, whereby a central portion of the film moves toward an upstream side and anisotropy in both end portions becomes strong when the film is softened by heating in the heat setting step though the film does not move because both end portions are held by gripping tools. Although this phenomenon cannot be prevented by sequential biaxial orientation in the machine direction and a direction perpendicular to that direction, this phenomenon can be slightly lightened by orientation in relatively crossing directions.

The draw ratio in the crossing directions is preferably 3 to 5 times. The lower limit of draw ratio in the crossing directions is more preferably 3.6 times and the upper limit is more preferably 4.0 times. When the draw ratio in the crossing directions is smaller than 3.0 times, thickness uniformity may worsen and when the draw ratio is larger than 5.0 times, the film may often break at the time of stretching.

The heat setting temperature is (Tg+100° C.) or more and (Tg+140° C.) or less (Tg is the secondary transition temperature of the polyester). When the heat setting temperature is lower than (Tg+100° C.), the dimensional change becomes large, an oligomer readily separates out, and the film is easily whitened. Further, the film is wrinkled during thermal relaxation with the result of deteriorated flatness. When the heat setting temperature is higher than (Tg+140° C.), anisotropy in the both end portions increases, the film easily becomes opaque, and thickness nonuniformity grows.

To narrow the distance between the guide rails of the gripping tools to alleviate stress in the heat setting step is effective in reducing thermal shrinkage factors, particularly thermal shrinkage factors in the crossing directions. The relaxation rate in the crossing directions in this stress alleviation is preferably 0.5 to 5%. When the relaxation rate is smaller than 0.5%, only a small effect is obtained and when the relaxation rate is larger than 5%, flatness deteriorates. Generally speaking, the gripping tools release the film when the film temperature falls below 100° C. When the gripping tools release the film at a temperature of 150 to 120° C. and pulling tension is made low, the thermal shrinkage factor in the machine direction is reduced effectively. When this temperature is higher than 150° C., flatness deteriorates and when the temperature is lower than 120° C., only a small effect is obtained. The film may be released from the gripping tools by cutting portions near the gripping tools with the blade of a knife or razor.

The thus produced biaxially oriented polyester film to be thermally relaxed by the method of the present invention does not satisfy at least one of the above expressions (1) to (5) as described above.

Preferably, the biaxially oriented polyester film which does not satisfy at least one of the above expressions (1) to (5) shrinks by 0.01 to 0.4% in the machine direction and by −0.1 to 0.1% in a direction perpendicular to that direction when it is heated at 150° C. for 30 minutes or has a thermal shrinkage factor in the machine direction of −0.15 to 0% when the temperature is raised from 30° C. to 120° C. at a rate of 3° C./min.

Thermal Relaxation

The biaxially oriented polyester film of the present invention can be obtained by thermally relaxing at least once the above formed biaxially oriented polyester film which does not satisfy at least one of the above:expressions (1) to (5). The thermal relaxation is carried out by a suspension system. The suspension system thermal relaxation is carried out, for example, by excluding tension on the feeding side of the film to be treated with a nip roller, suspending the film downward by its own weight from an upper roller while it is preheated to secure flatness, heating the film on the way, changing the direction of the film to a horizontal direction with a lower roller, cooling the film to maintain flatness, excluding winding tension with a nip roller and winding up the film. Tension between the upper and lower rollers can be obtained by installing a tension pick-up in the treatment section and adjusting motors for the nip rollers on the wind-off side and wind-up side.

The transport tension of the film during thermal relaxation is preferably 1 kPa or more and 500 kPa or less. The lower limit of transport tension of the film during thermal relaxation is more preferably 10 kPa, particularly preferably 20 kPa. The upper limit of transport tension of the film during thermal relaxation is more preferably 450 kPa, particularly preferably 400 kPa. When the transport tension of the film during thermal relaxation is lower then the above lower limit, flatness worsens and the film moves in a zigzag direction while it is carried, thereby reducing productivity. When the transport tension of the film during thermal relaxation is higher than the upper limit, the dimensional change becomes large disadvantageously.

The suspension distance at the time of thermal relaxation is preferably 1 m or more and 10 m or less. When the suspension distance is shorter than 1 m, the heating range becomes small, thereby reducing the processing speed and productivity. When the suspension distance is larger than 10 m, the film is apt to move in a zigzag direction while it is carried and flatness deteriorates disadvantageously.

The number of times of thermal relaxation must be at least one to obtain desired dimensional stability. It is preferably 2 or more. Thermal relaxation can be carried out any number of times until desired dimensional stability is obtained. When thermal relaxation is carried out two times or more, two or more zones for thermally relaxing the film in a suspension state are formed successively, or the film which has been thermally relaxed is thermally relaxed upside down in the same step. The inversion of the film at this point is aimed to prevent nonuniformity in dimensional stability in the transverse direction at the time of thermal relaxation.

The thermal relaxation of the present invention is not particularly limited if there are some measures for overcoming these. Although the heating system is not limited, infrared heating is preferred because it can heat immediately.

The thermal relaxation temperature is preferably Tg (secondary transition temperature of a polyester as a film raw material) or more and (Tg+140° C.) or less. The lower limit of thermal relaxation temperature is more preferably Tg+10° C., particularly preferably Tg+20° C. The upper limit of thermal relaxation temperature is more preferably Tg+120° C., particularly preferably Tg+110° C. When the thermal relaxation temperature is lower than Tg, it is difficult to reduce a dimensional change at 120° C. When the thermal relaxation temperature is higher than Tg+140° C., flatness may deteriorate and an oligomer may separate out, thereby whitening the film. This whitening is affected by pressure history. For example, when the film is transported by stretching a suspension belt on a film portion of a film roll, even if the thermal relaxation temperature is lower than Tg+140° C., a belt contacting portion is apt to be whitened. Therefore, care must be taken.

The temperature of the film is desirably measured using a non-contact infrared thermometer (for example, Burns type radiation thermometer). According to this suspension type thermal relaxation, the thermal shrinkage factors of the film at around both end portions can be controlled to the ranges of the present invention at the time of film formation.

Besides the above production method, there are methods of producing the biaxially oriented polyester film of the present invention. Since they have more defects than the method of the present invention, they cannot be recommended. If defects can be avoided, they can be employed. The methods are enumerated below.

(1) When an obliquely oriented portion can be used for another purpose, only a central portion in a width of the film formation is treated by any thermal relaxation method. Depending on the characteristic properties of the treated gray film, 50 to 80% of the portion can be used.

(2) When a transverse stretching machine having gripping tools comprises a device which is capable of making the input width and the output width almost equal to each other, the treating temperature is made much lower than in the heat treatment step described in the above section "film formation method" to halve the amount of shift of the central portion to form a film. The amount of shift is obtained by drawing a straight line in a transverse (width) direction of the film before it enters the transverse stretching machine with an inking string or like based on the amount of arcuate curvature of the line after the film comes out of the transverse stretching machine. This film is heated at 200 to 245° C. by passing through the device capable of making the input width and the output width almost equal to each other of the transverse stretching machine having gripping tools. At this point, it is important to treat the film such that the traveling direction of the film at the time of film formation becomes opposite to the traveling direction of the film at the time of the heat treatment and conditions are set to return the above arcuate line to almost a straight line. This treatment corrects anisotropy in the both end portions and prevents the thermal shrinkage factor in an oblique direction from becoming large.

The biaxially oriented polyester film of the present invention can be produced by thermally relaxing this film by any method. However, a reduction in productivity or a reduction in yield caused by the disuse of the gripping tools may not be eliminated. Only when the apparatus is available, this method can be employed.

(3) Floatation Running Type Thermal Relaxation

An air stream is blown onto the film from below and from above alternately to move the film in a horizontal direction while the film is floated in the form of a sine curve. During this time, the film is thermally relaxed by heating. This method has such an advantage that the roller does not contact the film during the formation and drying of a coating film but it is difficult to keep low tension for thermal relaxation. Therefore, low thermal shrinkage of the present invention may not be realized.

(4) Thermal Relaxation Between Rollers

Thermal relaxation is carried out by placing the film under low tension between two rollers having a nip roller and heating the film at that position. The film is apt to move in a zigzag direction and is difficult to run stably.

Whitening is easily caused by pressing the film with nip rollers before heating as described above, disadvantageously. This method can be used when this problem is solved.

Base Film for Photosensitive Material

The biaxially oriented polyester film of the present invention is suitable for use as a base film for a photosensitive material, particularly a base film for a photosensitive material of a thermal development system. When the polyester film is used as a base film for a photosensitive film and a thermal development system is used, the development temperature is generally around 120° C. in most cases. Therefore, it is important that the size of the film should be stable at this temperature.

When the biaxially oriented polyester film of the present invention satisfies the above expressions (1) to (5) at the same time, it satisfies the above requirement for a base film for a photosensitive material.

The present invention will be described in more detail with reference to the following examples.

Examples

The following examples are given to further illustrate the present invention. Physical property values and characteristic properties in the present invention were measured and defined as follows.

(1) Average Particle Diameter when Inert Particles are Monodisperse Particles

This is measured using the CP-50 centrifugal particle size analyzer of Shimadzu Corporation. A particle diameter equivalent to 50 mass percent is read from a cumulative curve of the particles of each diameter and the amount thereof calculated based on the obtained centrifugal sedimentation curve and taken as the average particle diameter of monodisperse particles (refer to “Book of Particle Size Measurement Technology” issued by Nikkan Kogyo Press, pp. 242–247, 1975).

(2) Average Particle Diameter when Inert Particles are Agglomerates

When inert fine particles as the added lubricant are secondary particles which are agglomerates of primary particles, the particle diameter obtained by the average particle diameter measurement method (1) might be smaller than the actual average particle diameter. Therefore, the following method is employed.

A super thin piece having a thickness of 100 nm in a sectional direction is obtained from a film containing particles and agglomerates (secondary particles) of particles are observed through a transmission electron microscope (for example, JEM-1200EX of JEOL Ltd.) at a magnification of 10,000X. The circle area equivalent diameter of each of 1,000 particles of the microphotograph is measured using an image analyzer or the like and a number average value (average secondary particle diameter) is taken as the average particle diameter of the agglomerates. The species of the particles can be identified by the quantitative analysis of a metal element with SEM-XMA or ICP. The average primary particle diameter is measured in accordance with the method of measuring the average secondary particle diameter using a transmission electron microscope at a magnification of 100,000X to 1,000,000X.

(3) Thermal Shrinkage Factor when Heated at 120° C. for 20 Seconds (120° C. Thermal Shrinkage Factor)

Measurement samples are collected from 0°, 45°, 90° and 135° directions when the mechanical axial direction (longitudinal direction) of the film is 00’. The samples are collected from portions near end portions in a transverse direction of the film at the time of film formation. The shape of each sample is rectangular measuring 15 cm×5 cm. To measure a dimensional change in the longitudinal direction of the film, 15 cm sides are sampled in parallel to the machine direction (longitudinal direction). As for the other direction, 15 cm sides are sampled in parallel to the measurement direction.

Thereafter, two points are marked on the center portion of the above sample at an interval of 10 cm, the sample having a desired length is kept in a thermostat chamber maintained at 23° C. and 55%RH for 24 hours or more, and the distance ($R_0$) between the two points is measured with a reading microscope. This rectangular sample is then heated at 120° C. and pressed against a flat stainless plate for 20 seconds. Thereafter, the sample having a desired length is kept at a constant temperature of 23° C. and a constant humidity of 55%RH for 24 hours or more and the distance (R) between the points is measured to obtain a thermal shrinkage factor from the length $R_0$ before the heat treatment and the length R after the heat treatment according to the following expression.

$$120°\text{ C. thermal shrinkage factor}=(R_0-R)\times 100/R_0\ (\%)$$

120° C. thermal shrinkage factors in respective directions are represented by the following symbols.

$S_{MD}$: 120° C. thermal shrinkage factor in 0° direction (machine direction)

$S_{45}$: 120° C. thermal shrinkage factor in 45° direction $S_{TD}$: 120° C. thermal shrinkage direction in 90° direction (direction perpendicular to the mechanical axial direction)

$S_{135}$: 120° C. thermal shrinkage factor in 135° direction (4) Thermal Shrinkage Factor when Heated at 150° C. for 30 Minutes (150° C. Thermal Shrinkage Factor)

Samples which can be measured for their thermal shrinkage factors in longitudinal and transverse directions of the film are collected. The samples are square measuring 35 cm×5 cm. To measure a dimensional change in the longitudinal direction of the film, 35 cm sides are sampled in: parallel to the longitudinal direction. To measure a dimensional change in the transverse direction of the film, 35 cm sides are sampled in parallel to the transverse direction. Thereafter, two points are marked on the central portion of the film at an interval ($L_0$) of 30 cm and the film is placed in a thermostat chamber maintained at 150° C. under no tension, kept for 30 minutes (heat treatment), taken out and returned to room temperature to read its dimensional change. The thermal shrinkage factors in the machine direction (longitudinal direction) and a direction (transverse direction) perpendicular to that direction of the film are obtained from the length, $L_0$ before the heat treatment and the length L after the heat treatment according to the following expression.

$$150°\text{ C. thermal shrinkage factor}=(L_0-L)\times 100/L_0\ (\%)$$

When the Value of thermal shrinkage factor is negative (–), it means elongation and the absolute value is taken as elongation factor.

Measurement samples are collected from the machine direction MD (longitudinal direction) and a direction (transverse direction) TD perpendicular to that direction. The samples are collected from portions near end portions in the transverse direction of the film at the time of film formation. 150° C. thermal shrinkage factors (elongation factors) in respective directions are represented by the following symbols.

$C_{MD}$: 150° C. thermal shrinkage factor in machine direction $C_{TD}$: 150° C. thermal shrinkage factor in direction perpendicular to the above direction $E_{MD}$: 150° C. elongation factor in machine direction $E_{TD}$: 150° C. elongation factor in direction perpendicular to the above direction (5) Thermal Shrinkage Factor when Temperature is Raised from 30° C. to 120° C. at a Rate of 3° C./min (30 to 120° C. Thermal Shrinkage Factor)

Analysis by a thermal mechanical property tester (to be abbreviated as "TMA" hereinafter) is carried out under the following conditions. Samples which can be measured for their thermal shrinkage factors in longitudinal and transverse directions of the film are collected from three portions, central and both end portions of a biaxially oriented polyester film. The samples are rectangular measuring 30 mm×4 mm. To measure a dimensional change in the longitudinal direction of the film, 30 mm sides are sampled in parallel to the longitudinal direction. To measure a dimensional change in the transverse direction of the film, 30 mm sides are sampled in parallel to the transverse direction.

The TMA/SS120C measuring instrument of Seiko Instruments, Co., Ltd. is used to measure a dimensional change by applying tension lower than tension at the time of thermal relaxation and raising the temperature from 25° C. to 150° C. at a rate of 30° C./min in a nitrogen air stream after the sample is set such that the chuck interval becomes 20 mm. The sizes of the film at 30° C. and 120° C. are measured at all the measurement points to obtain a thermal dimensional change rate (%) from the following expression and the average value of the measurement data is taken as 30 to 120° C. thermal shrinkage factor (%).

thermal dimensional change rate (%)=10033 {(size at 120° C.−size at 30° C.)}/(size at 30° C.)

30 to 120° C. thermal shrinkage factors in respective directions are represented by the following symbols.

$B_{MD}$: 30 to 120° C. thermal shrinkage factor (%) in longitudinal direction of film before thermal relaxation $B_{TD}$: 30 to 120° C. thermal shrinkage factor (%) in transverse direction of film before thermal relaxation $A_{MD}$: 30 to 120° C. thermal shrinkage factor (%) in longitudinal direction of film after thermal relaxation $A_{TD}$: 30 to 120° C. thermal shrinkage factor (%) in transverse direction of film after thermal relaxation (6) Film Thickness The thickness of the film is measured at 100 points by an external micrometer and the average value of the measurement data is taken as the thickness of the film.

(7) Haze Value

The total haze value of each film is measured by a commercially available haze meter in accordance with JIS K 6714. The number of measurement times (n) is 5 and the average value of the measurement data is taken as haze value.

(8) Surface Roughness Ra (center Line Surface Roughness Ra)

The center line surface roughness Ra of one side of the film is measured by a surface roughness meter (Surfcom 111A of Tokyo Seimitsu Co., Ltd.) and the average value of the measurement data is taken as surface roughness Ra.

(9) Dynamic Friction Coefficient

The dynamic friction coefficient (μd) of one side of the film is measured under a load of 1 kg by a slipperiness measuring instrument (of Toyo Tester Co., Ltd.) using a glass plate as a sled plate in accordance with ASTM D1894-63.

(10) Amount of Curvature

A 20 m long film sample is collected from a film roll and adhered to a flat floor without a distortion. A starting point and an end point of one side end in a transverse direction of the film are connected by a straight line and the amount of deviation of the end in the transverse direction of the film at an intermediate point (10 m point) in the longitudinal direction from the straight line is obtained as the amount of curvature per 10 m of the film. The value per 1 m of the film is calculated from the above value and taken as the amount of curvature.

(11) Flatness

The film is spread over a flat cork base and the surface of the film is leveled with nonwoven cloth, sponge-like rod or brush to eliminate air between the film and the base completely. After the passage of 5 minutes, the state of the film is observed and the number of portions where the film floats from the base is counted. When the number of floating portions is 5 or less, the film is evaluated as ○, when the number of floating portions is 10 or more, the film is evaluated as × and when the number of floating portions is 6 to 9, the film is evaluated as Δ.

(12) Secondary Transition Temperature (Tg)

10 mg of a film sample is molten at 300° C. for 5 minutes, quenched at a temperature lower than room temperature and then heated at a temperature elevation rate of 20° C./min to measure its secondary transition temperature using DSC (V4. OB2000 of DuPont Co., Ltd.).

(13) Dimensional Change After Thermal Development

An imitation test is carried out using a biaxially oriented polyester film without processing for an actual photosensitive material. The same good results as in this test can be expected from actual thermal development if the characteristic properties of the biaxially oriented polyester film of the present invention are retained, without having excessive pressure at processing for photosensitive material.

Samples measuring 60 (length)×55 (width) cm are collected from a center portion in the transverse direction and both end portions of the film at the time of film formation. They are kept at 25° C. and 60%RH for 24 hours and registration marks (dragonfly) which are 50 cm apart from each other in both vertical and horizontal directions are put on the four corners. After they are heated at 120° C. for 30 seconds and 115° C. for 30 seconds (imitation heat phenomenon), they are kept at 25° C. and 60%RH for 24 hours, and three samples of the film are placed one upon another to measure the maximum dislocations of the registration marks with magnifying glass. When the maximum dislocation is larger than 60 μm, a color drift is observed with the naked eye at the time of plate making. Therefore, the film is not accepted. The film is evaluated based on the following criteria.

○: The maximum dislocations of registration marks on central and both end portions are 60 μm or less.

Δ: Either one of the maximum dislocations of registration marks on central and both end portions is 60 μm or less.

×: The maximum dislocations of registration marks on central and both end portions are more than 60 μm.

(14) Image Sharpness

An image forming layer is formed on the film and an image is formed by thermal development to judge the sharpness and contrast of each of 10 images visually based on the following criteria.

◎: excellent (particularly preferred because sharpness is within the targeted range of the present invention)

○: good (preferred because sharpness is within the targeted range of the present invention)

Δ: slightly bad (not attaining the target of the present invention)

×: bad (far from the target of the present invention)

(15) Overall Evaluation

Overall evaluation is made on the results of flatness, dimensional change after thermal development, image sharpness, amount of curvature and dynamic friction coefficient of the film.

○: excellent (all the above results are good)

Δ: good (any one of the above results is slightly unsatisfactory)

×: bad (any one of the above results is fatally bad)

Example 1

Dimethyl terephthalate and ethylene glycol were polymerized by adding manganese acetate as an ester exchange catalyst, antimony trioxide as a polymerization catalyst, phosphorous acid as a stabilizer and porous silica particles having an average particle diameter of 1.7 μm which were agglomerates of particles as a lubricant in an amount of 0.007 wt % based on the polymer in accordance with a commonly used method to obtain polyethylene terephthalate (PET,. Tg: 78° C.) having an intrinsic viscosity (measured at 35° C. in orthochlorophenol) of 0.65 dl/g.

This polyethylene terephthalate was molten at a temperature of 295° C. by an extruder, filtered by a nonwoven filter made from a stainless thin wire having a line diameter of 13 μm and having an average aperture of 24 μm, melt extruded into a sheet form from a T die and cooled on a rotary cooling drum having a surface finishing of 0.3 S and a surface temperature of 20° C. to obtain an unstretched film. This unstretched film was then preheated at 75° C., stretched to 3.1 times between low-speed and high-speed rollers in a longitudinal direction (machine direction) by heating with a single infrared heater having a surface temperature of 800° C. from 15 mm above, quenched and supplied to a stenter to be stretched to 3.9 times in a transverse direction (width direction) at 120° C. The obtained biaxially oriented film was heat set at 235° C. for 5 seconds, relaxed by 1.5% in a transverse direction and separated from gripping tools when the film temperature was reduced to around 100° C. to obtain a 100 μm thick biaxially polyester film. This film was thermally relaxed by a suspension type thermal relaxation apparatus at a temperature of 130° C., a suspension distance of 3 m and a processing speed of 20 m/min to obtain a biaxially oriented polyester film (final product). The evaluation results of the characteristic properties of this film are shown in Table 1.

Example 2

Manganese acetate tetrahydrate was added to a mixture of dimethyl 2,6-naphthalene dicarboxylate and ethylene glycol to carry out an ester exchange reaction while the temperature was gradually raised from 150° C. to 240° C. When the reaction temperature reached 170° C., antimony trioxide was added, 0.07 part by weight of porous silica particles having an average particle diameter of 1.7 μm was furtheradded, and then an ester exchange reaction was carried out. After the end of the ester exchange reaction, trimethyl phosphate was added. The reaction product was then transferred to a polymerizer to carry out a polycondensation reaction by increasing the temperature to 290° C. under a high vacuum of 27 Pa (0.2 mmHg) or less so as to obtain polyethylene-2,6-naphthalate (PEN, Tg: 121° C.) having an intrinsic viscosity (measured at 35° C. in orthochlorophenol) of 0.62 dl/g.

This PEN polymer was molten at a temperature of 300° C. by an extruder, filtered by a nonwoven filter made from a stainless thin wire having a line diameter of 13 μm and having an average aperture of 24 μm, melt extruded into a sheet form from a T die and solidified by cooling on a 30° C. water cooled casting drum to obtain an unstretched film. This unstretched film was stretched to 3.0 times in a longitudinal direction (machine direction) between rolls by infrared heating. Thereafter, the film was stretched to 4.0 times in a transverse direction at 140° C. and relaxed by 1.2% in a transverse direction (width direction) while it was heat set at 240° C. for 5 seconds, and separated from gripping tools when the film temperature was reduced to around 130° C. A 75 μm thick biaxially oriented polyester film was thus obtained. This film was thermally relaxed by a suspension type thermal relaxation apparatus under the same conditions as in Example 1 except that the temperature was changed to 135° C. to obtain a biaxially oriented polyester film (final product). The evaluation results of the characteristic properties of this film are shown in Table 1.

Comparative Example 1

A 100 μm thick biaxially oriented polyester film was obtained in the same manner as in Example 1 except that floatation running type thermal relaxation was carried out at 140° C. in place of suspension type thermal relaxation. The evaluation results of the characteristic properties of this film are shown in Table 1.

Comparative Example 2

A 75 μm thick biaxially oriented polyester film was obtained in the same manner as in Example 2 except that suspension type thermal relaxation was not carried out. The evaluation results of the characteristic properties of this film are shown in Table 1.

Example 3

A 100 μm thick biaxially oriented polyester film was obtained in the same manner as in Example 1 except that kaolin clay having an average particle diameter of 0.9 μm was added in an amount of 0.25 wt % based on the polymer in place of porous silica. The evaluation results of the characteristic properties of this film are shown in Table 1.

TABLE 1

| | | Ex. 1 | Ex. 2 | Ex. 3 | C. Ex. 1 | C. Ex. 2 |
|---|---|---|---|---|---|---|
| 120° C. thermal shrinkage factors | | | | | | |
| $S_{MD}$ | % | 0.05 | 0.04 | 0.05 | 0.12 | 0.20 |
| $S_{TD}$ | % | 0.05 | 0.03 | 0.05 | 0.02 | 0.01 |
| $S_{45}$ | % | 0.04 | 0.03 | 0.04 | 0.15 | 0.21 |
| $S_{135}$ | % | −0.01 | −0.01 | −0.01 | 0.01 | 0.01 |
| $\|S_{45}-S_{135}\|$ | % | 0.05 | 0.04 | 0.05 | 0.14 | 0.20 |
| film thickness | μm | 100 | 75 | 100 | 100 | 75 |
| haze | | 1.5 | 1.6 | 13 | 1.5 | 1.3 |
| surface roughness Ra | nm | 10 | 6 | 27 | 10 | 6 |
| dynamic friction coefficient | | 0.30 | 0.26 | 0.21 | 0.30 | 0.26 |
| amount of curvature | mm | 3 | 2 | 3 | 7 | 10 |
| dimensional change after thermal development | | ○ | ○ | ○ | X | X |
| image sharpness | | ○ | ○ | X | ○ | ○ |
| overall evaluation | | ○ | ○ | Δ | X | X |

Ex.: Example
C. Ex.: Comparative Example

As is obvious from Table 1, the biaxially oriented polyester film of the present invention has excellent transparency, slipperiness and winding properties and is excellent as a base film for a photosensitive material.

Examples 4 to 6

The 150° C. thermal shrinkage factors of the biaxially oriented polyester film before thermal relaxation obtained in Example 1 are shown in Table 2. The film was thermally relaxed under conditions shown in Table 2 using a suspension type thermal relaxation apparatus to obtain a final product. The evaluation results of the characteristic properties of the obtained biaxially oriented polyester film are shown in Table 2.

Example 7

The 150° C. thermal shrinkage factors of the biaxially oriented polyester film before thermal relaxation obtained in Example 2 are shown in Table 2. The film was thermally relaxed under conditions shown in Table 2 using a suspension type thermal relaxation apparatus to obtain a final product. The evaluation results of the characteristic properties of the obtained biaxially oriented polyester film are shown in Table 2.

Example 8

A biaxially oriented polyester film was obtained in the same manner as in Example 4 except that floatation running type thermal relaxation was carried out under conditions shown in Table 2 in place of suspension type thermal relaxation. The evaluation results of the characteristic properties of this film are shown in Table 2.

Example 9

A biaxially oriented polyester film was obtained by thermal relaxation in the same manner as in Example 4 except that kaolin clay having an average particle diameter of 0.9 μm was added in an amount of 0.25 wt % based on the polymer in place of porous silica. The evaluation results of the characteristic properties of this film are shown in Table 2.

Comparative Examples 3 and 4

Polyethylene terephthalate obtained in Example 1 was molten at a temperature of 295° C. by an extruder, filtered by a nonwoven filter made from a stainless thin wire having a line diameter of 13 μm and having an average aperture of 24 μm, and extruded from a T die onto a rotary cooling drum having a surface finishing of 0.3 S and a surface temperature of 20° C. to obtain an unstretched film. The thus obtained unstretched film was preheated at 750° C., stretched to 3.6 times between low-speed and high-speed rolls by heating with a single infrared heater having a surface temperature of 800° C. from 15 mm above, quenched and supplied to a stenter to be stretched to 3.7 times in a transverse direction at 120° C. The obtained biaxially oriented film was heat set at 235° C. for 5 seconds to obtain a biaxially oriented polyester film. The 150° C. thermal shrinkage factors before thermal relaxation of this film are shown in Table 2. The film was thermally relaxed under conditions shown in Table 2 using a suspension type thermal relaxation apparatus to obtain a final product. The evaluation results of the characteristic properties of this film are shown in Table 2.

TABLE 2

| | | Ex. 4 | Ex. 5 | Ex. 6 | Ex. 7 | Ex. 8 | Ex. 9 | C. Ex. 3 | C. Ex. 4 |
|---|---|---|---|---|---|---|---|---|---|
| 150° C. thermal shrinkage factor before thermal relaxation | | | | | | | | | |
| $C_{MD}$ (longitudinal direction) | % | 0.27 | 0.30 | 0.32 | 0.30 | 0.28 | 0.29 | 0.90 | 0.80 |
| 150° C. thermal elongation factor before thermal relaxation | | | | | | | | | |
| $E_{TD}$ (transverse direction) | % | 0.04 | 0.03 | 0.05 | 0.02 | 0.08 | 0.06 | −0.19 | −0.21 |
| thermal relaxation temperature | ° C. | 220 | 220 | 220 | 220 | 140 | 220 | 220 | 220 |
| 150° C. thermal shrinkage factor after thermal relaxation | | | | | | | | | |
| $C_{MD}$ (longitudinal direction) | % | 0.14 | 0.18 | 0.16 | 0.19 | 0.26 | 0.19 | 0.55 | 0.45 |
| 150° C. thermal elongation factor after thermal relaxation | | | | | | | | | |
| $E_{TD}$ (transverse direction) | % | 0.06 | 0.05 | 0.06 | 0.04 | 0.01 | 0.05 | −0.03 | −0.01 |
| 120° C. thermal shrinkage factors | | | | | | | | | |
| $S_{MD}$ | % | 0.04 | 0.06 | 0.05 | 0.04 | 0.21 | 0.09 | 0.31 | 0.24 |
| $S_{TD}$ | % | 0.03 | 0.03 | 0.05 | 0.03 | 0.01 | 0.03 | 0.11 | 0.05 |
| $S_{45}$ | % | 0.02 | 0.03 | 0.04 | 0.03 | 0.15 | 0.06 | 0.19 | 0.13 |
| $S_{135}$ | % | −0.02 | −0.01 | −0.01 | −0.01 | 0.10 | −0.01 | 0.12 | 0.06 |
| $\|S_{45}-S_{135}\|$ | % | 0.04 | 0.04 | 0.05 | 0.04 | 0.05 | 0.07 | 0.07 | 0.07 |
| film thickness | μm | 100 | 100 | 100 | 75 | 100 | 100 | 100 | 100 |
| haze | | 1.7 | 1.6 | 1.7 | 1.4 | 1.8 | 15 | 1.6 | 1.6 |
| surface roughness Ra | nm | 8 | 7 | 8 | 7 | 9 | 28 | 9 | 8 |
| dynamic friction coefficient | | 0.31 | 0.32 | 0.28 | 0.29 | 0.33 | 0.22 | 0.29 | 0.31 |
| amount of curvature | mm | 2 | 3 | 2 | 1 | 7 | 2 | 8 | 6 |
| flatness | | ○ | ○ | ○ | ○ | Δ | ○ | X | Δ |
| dimensional change after thermal development | | ○ | ○ | ○ | ○ | ○ | Δ | X | X |
| image sharpness | | ○ | ○ | ○ | ○ | Δ | Δ | ○ | ○ |
| overall evaluation | | ○ | ○ | ○ | ○ | Δ | Δ | X | X |

Ex.: Example
C. Ex.: Comparative Example

As is obvious from the results shown in Table 2, the biaxially oriented polyester film of the present invention has excellent flatness, transparency, slipperiness and winding properties and is excellent as a base film for a photosensitive material.

Examples 10 to 12

The 30 to 120° C. thermal shrinkage factor ($B_{MD}$) of the biaxially oriented polyester film before thermal relaxation obtained in Example 1 is shown in Table 3. The film was thermally relaxed under conditions shown in Table 3 using a suspension type thermal relaxation apparatus to obtain a final product. The evaluation results of the characteristic properties of this biaxially oriented polyester film are shown in Table 3.

Example 13

The 30 to 120° C. thermal shrinkage factor ($B_{MD}$) of the biaxially oriented polyester film before thermal relaxation obtained in Example 2 is shown in Table 3. The film was thermally relaxed under conditions shown in Table 3 using a suspension type thermal relaxation apparatus to obtain a final product. The evaluation results of the characteristic properties of this biaxially oriented polyester film are shown in Table 3.

Example 14

A biaxially oriented polyester film was obtained in the same manner as in Example 10 except that floatation running type thermal relaxation was carried out under conditions shown in Table 3 in place of suspension type thermal relaxation. The evaluation results of the characteristic properties of this film are shown in Table 3.

Example 15

A biaxially oriented polyester film was obtained in the same manner as in Example 10 except that kaolin clay having an average particle diameter of 0.9 μm was added in an amount of 0.25 wt % based on the polymer in place of porous silica. The evaluation results of the characteristic properties of this film are shown in Table 3.

Comparative Examples 5 and 6

The 30 to 120° C. thermal shrinkage factors of the biaxially oriented polyester films before thermal relaxation obtained in Comparative Examples 3 and 4 are shown in Table 3. The films were thermally relaxed under conditions shown in Table 3 using a suspension type thermal relaxation apparatus to obtain final products. The evaluation results of the characteristic properties of the films are shown in Table 3.

TABLE 3

| | | Ex. 10 | Ex. 11 | Ex. 12 | Ex. 13 | Ex. 14 | Ex. 15 | C. Ex. 5 | C. Ex. 6 |
|---|---|---|---|---|---|---|---|---|---|
| 30 to 120° C. thermal shrinkage factor | | | | | | | | | |
| $B_{MD}$ | % | −0.087 | −0.062 | −0.082 | −0.057 | −0.121 | −0.096 | −0.732 | −0.921 |
| thermal relaxation temperature | ° C. | 220 | 220 | 220 | 220 | 140 | 220 | 220 | 220 |
| thermal relaxation tension | kPa | 216 | 79 | 216 | 367 | 489 | 216 | 216 | 79 |
| 30 to 120° C. thermal shrinkage factor | | | | | | | | | |
| $A_{MD}$ | % | 0.057 | 0.045 | 0.111 | 0.124 | −0.091 | 0.105 | −0.133 | −0.021 |
| 30 to 120° C. thermal shrinkage factor | | | | | | | | | |
| $A_{TD}$ | % | −0.003 | 0.011 | 0.042 | −0.04 | −0.032 | −0.01 | −0.041 | 0.008 |
| 120° C. thermal shrinkage factors | | | | | | | | | |
| $S_{MD}$ | % | 0.06 | 0.04 | 0.07 | 0.08 | 0.23 | 0.09 | 0.30 | 0.24 |
| $S_{TD}$ | % | 0.03 | 0.03 | 0.05 | 0.03 | 0.02 | 0.03 | 0.11 | 0.05 |
| $S_{45}$ | % | 0.03 | 0.02 | 0.03 | 0.04 | 0.15 | 0.06 | 0.18 | 0.12 |
| $S_{135}$ | % | −0.01 | −0.02 | −0.01 | −0.01 | 0.10 | −0.01 | 0.12 | 0.06 |
| $\|S_{45}-S_{135}\|$ | % | 0.04 | 0.04 | 0.04 | 0.05 | 0.05 | 0.07 | 0.06 | 0.06 |
| film thickness | μm | 100 | 100 | 75 | 100 | 100 | 100 | 100 | 100 |
| haze | | 1.6 | 1.5 | 1.2 | 1.7 | 1.6 | 15 | 1.8 | 1.7 |
| surface roughness Ra | nm | 8 | 8 | 9 | 10 | 7 | 31 | 9 | 9 |
| dynamic friction coefficient | | 0.32 | 0.30 | 0.29 | 0.26 | 0.30 | 0.19 | 0.29 | 0.28 |
| amount of curvature | mm | 2 | 1 | 3 | 4 | 13 | 4 | 5 | 6 |
| dimensional change after thermal development | | ○ | ○ | ○ | ○ | Δ | ○ | X | X |
| image sharpness | | ○ | ○ | ○ | ○ | ○ | Δ | ○ | ○ |
| overall evaluation | | ○ | ○ | ○ | ○ | Δ | Δ | X | X |

Ex.: Example
C. Ex.: Comparative Example

As is obvious from the results shown in Table 3, the biaxially oriented polyester film of the present invention has excellent transparency, slipperiness and winding properties and is excellent as a base film for a photosensitive material.

Examples 16 to 19

The 150° C. thermal shrinkage factors of the biaxially oriented polyester film before thermal relaxation obtained in Example 1 are shown in Table 4. The film was thermally relaxed under conditions shown in Table 4 using a suspension type thermal relaxation apparatus to obtain a final product. The evaluation results of the characteristic properties of this biaxially oriented polyester film are shown in Table 4.

Example 5

The 150° C. thermal shrinkage factors of the biaxially oriented polyester film before thermal relaxation obtained in Example 2 are shown in Table 4. The film was thermally relaxed under conditions shown in Table 4 using a suspension type thermal relaxation apparatus to obtain a final product. The evaluation results of the characteristic properties of this biaxially oriented polyester film are shown in Table 4.

Example 20

A biaxially oriented polyester film was obtained in the same manner as in Example 16 except that floatation running type thermal relaxation was carried out under conditions shown in Table 4 in place of suspension type thermal relaxation. The evaluation results of the characteristic properties of this film are shown in Table 4.

Example 7

A biaxially oriented polyester film was obtained in the same manner as in Example 16 except that kaolin clay having an average particle diameter of 0.9 μm was added in an amount of 0.25 wt % based on the polymer in place of porous silica. The evaluation results of the characteristic properties of this film are shown in Table 4.

Comparative Examples 7 and 8

The 150° C. thermal shrinkage factors of the biaxially oriented polyester films before thermal relaxation obtained in Comparative Examples 3. and 4 are shown in Table 4. The films were thermally relaxed under conditions shown in Table 4 using a suspension type thermal relaxation apparatus to obtain final products. The evaluation results of the characteristic properties of the films are shown in Table 4.

excellent transparency, slipperiness and winding properties and is excellent as a base film for a photosensitive material.

Examples 23 to 25

The biaxially oriented polyester film before thermal relaxation obtained in Example 1 was thermally relaxed under conditions shown in Table 5 using a suspension type thermal relaxation apparatus to obtain a final product. The evaluation results of the characteristic properties of this biaxially oriented polyester film are shown in Table 5.

Example 26

The biaxially oriented polyester film before thermal relaxation obtained in Example 2 was thermally relaxed under conditions shown in Table 5 using a suspension type thermal relaxation apparatus to obtain a final product. The evaluation results of the characteristic properties of this biaxially oriented polyester film are shown in Table 5.

Example 27

A biaxially oriented polyester film was obtained in the same manner as in Example 23 except that kaolin clay having an average particle diameter of 0.9 μm was added in an amount of 0.25 wt % based on the polymer in place of porous silica. The evaluation results of the characteristic properties of this film are shown in Table 5.

Comparative Example 9

A biaxially oriented polyester film was obtained in the same manner as in Example 23 except that relaxation in a transverse direction was not carried out and floatation running type thermal relaxation was carried out under conditions shown in Table 5 in place of suspension type thermal relaxation. The evaluation results of the characteristic properties of this film are shown in Table 5.

TABLE 4

| | | Ex. 16 | Ex. 17 | Ex. 18 | Ex. 19 | Ex. 20 | Ex. 21 | Ex. 22 | C. Ex. 7 | C. Ex. 8 |
|---|---|---|---|---|---|---|---|---|---|---|
| 150° thermal shrinkage factor before thermal relaxation | | | | | | | | | | |
| $C_{MD}$ (longitudinal direction) | % | 0.17 | 0.18 | 0.2 | 0.14 | 0.15 | 0.15 | 0.17 | 0.89 | 0.75 |
| $C_{TD}$ (transverse direction) | % | −0.03 | −0.01 | 0.01 | 0.03 | 0.02 | −0.03 | 0.01 | 0.37 | 0.24 |
| thermal relaxation temperature | ° C. | 220 | 220 | 220 | 220 | 220 | 140 | 210 | 220 | 220 |
| thermal relaxation tension | kPa | 216 | 367 | 79 | 216 | 216 | 489 | 216 | 216 | 79 |
| 120° C. thermal shrinkage factors | | | | | | | | | | |
| $S_{MD}$ | % | 0.04 | 0.07 | 0.05 | 0.06 | 0.08 | 0.14 | 0.05 | 0.4 | 0.23 |
| $S_{TD}$ | % | −0.05 | −0.03 | −0.03 | 0.01 | −0.04 | −0.01 | −0.03 | 0.19 | 0.09 |
| $S_{45}$ | % | 0.01 | 0.03 | 0.02 | 0.03 | 0.01 | 0.07 | 0.04 | 0.21 | 0.07 |
| $S_{135}$ | % | −0.01 | 0.01 | −0.02 | 0.02 | −0.02 | 0.09 | −0.01 | 0.15 | 0.08 |
| $\|S_{45}-S_{135}\|$ | % | 0.02 | 0.02 | 0.05 | 0.05 | 0.03 | 0.02 | 0.05 | 0.06 | 0.01 |
| film thickness | μm | 100 | 100 | 100 | 75 | 100 | 100 | 100 | 100 | 100 |
| haze | | 1.5 | 1.6 | 1.6 | 1.3 | 1.3 | 1.6 | 13 | 1.6 | 1.8 |
| surface roughness Ra | nm | 7 | 8 | 8 | 10 | 6 | 8 | 27 | 8 | 9 |
| dynamic friction coefficient | | 0.30 | 0.32 | 0.28 | 0.25 | 0.26 | 0.32 | 0.20 | 0.29 | 0.33 |
| amount of curvature | mm | 3 | 1 | 2 | 4 | 2 | 13 | 5 | 11 | 8 |
| dimensional change after thermal development | | ○ | ○ | ○ | ○ | ○ | Δ | ○ | X | X |
| image sharpness | | ○ | ○ | ○ | ○ | ○ | ○ | Δ | ○ | ○ |
| overall evaluation | | ○ | ○ | ○ | ○ | ○ | Δ | Δ | X | X |

Ex.: Example
C. Ex.: Comparative Example

As is obvious from the results shown in Table 4, the biaxially oriented polyester film of the present invention has

Comparative Example 10

A biaxially oriented polyester film was obtained in the same manner as in Example 23 except that suspension type thermal relaxation was not carried out. The evaluation results of the characteristic properties of this film are shown in Table 5.

0 to 0.2% in a direction perpendicular to that direction when it is heated at 150° C. for 30 minutes.

TABLE 5

| | | Ex. 23 | Ex. 24 | Ex. 25 | Ex. 26 | Ex. 27 | C. Ex. 9 | C. Ex. 10 |
|---|---|---|---|---|---|---|---|---|
| thermal relaxation temperature | ° C. | 220 | 220 | 210 | 220 | 210 | 220 | — |
| thermal relaxation tension | kPa | 216 | 367 | 79 | 216 | 216 | 216 | — |
| number of times of thermal relaxation | | 1 | 2 | 1 | 1 | 1 | 1 | — |
| 120° C. thermal shrinkage factors | | | | | | | | |
| $S_{MD}$ | % | 0.05 | 0.03 | 0.04 | 0.05 | 0.05 | 0.2 | 0.12 |
| $S_{TD}$ | % | −0.06 | −0.07 | −0.07 | −0.01 | −0.03 | 0.01 | 0.02 |
| $S_{45}$ | % | 0.04 | 0.03 | 0.03 | 0.03 | 0.04 | 0.21 | 0.15 |
| $S_{135}$ | % | −0.01 | 0.01 | −0.02 | −0.02 | −0.01 | 0.01 | 0.03 |
| $\|S_{45}-S_{135}\|$ | % | 0.05 | 0.02 | 0.05 | 0.05 | 0.05 | 0.2 | 0.12 |
| film thickness | μm | 100 | 100 | 75 | 100 | 100 | 100 | 100 |
| haze | | 1.5 | 1.6 | 1.3 | 1.3 | 13 | 1.6 | 1.5 |
| surface roughness Ra | nm | 7 | 8 | 8 | 6 | 27 | 8 | 10 |
| dynamic friction coefficient | | 0.30 | 0.32 | 0.28 | 0.26 | 0.20 | 0.29 | 0.30 |
| amount of curvature | mm | 3 | 1 | 2 | 2 | 5 | 10 | 7 |
| dimensional change after thermal development | | ○ | ○ | ○ | ○ | ○ | X | X |
| image sharpness | | ○ | ○ | ○ | ○ | Δ | ○ | ○ |
| overall evaluation | | ○ | ○ | ○ | ○ | Δ | X | X |

Ex.: Example
C. Ex.: Comparative Example

As is obvious from the results shown in Table 5, the biaxially oriented polyester film of the present invention has excellent transparency, slipperiness and winding properties and is excellent as a base film for a photosensitive material.

EFFECT OF THE INVENTION

The present invention can provide a biaxially oriented polyester film which has excellent flatness, high transparency with low thermal shrinkage factors in all directions, satisfactory winding and transport work efficiencies and always makes possible plate making without color drift when it is used in a photosensitive material of a thermal development system. This film can be widely used in such fields that require high dimensional stability as tracing films, microfilms and OHP sheets and has a high industrial value.

What is claimed is:

1. A biaxially oriented polyester film whose thermal shrinkage factors satisfy relationships represented by the following expressions (1) to (5) at the same time when it is heated at 120° C. for 20 seconds:

$$0.001 \leqq S_{MD} \leqq 0.1 \quad (1)$$

$$-0.1 \leqq S_{TD} \leqq \leqq 0.1 \quad (2)$$

$$-0.05 \leqq S_{45} \leqq 0.05 \quad (3)$$

$$-0.05 \leqq S_{135} \leqq 0.05 \quad (4)$$

$$|S_{45}-S_{135}| \leqq 0.05 \quad (5)$$

wherein $S_{MD}$ is a thermal shrinkage factor (%) in machine direction of the film under the above conditions, $S_{TD}$ is a thermal shrinkage factor (%) in a direction perpendicular to that direction under the above conditions, and $S_{45}$ and $S_{135}$ are thermal shrinkage factors (%) in a 45° direction and a direction perpendicular to the 45° direction under the above conditions when the machine direction of the film is 0° and a direction perpendicular to that direction is 90°, respectively.

2. The biaxially oriented polyester film of claim 1 which shrinks by 0 to 0.4% in machine direction and elongates by 0 to 0.2% in a direction perpendicular to that direction when it is heated at 150° C. for 30 minutes.

3. The biaxially oriented polyester film of claim 1 whose thermal shrinkage factor in machine direction is 0.001 to 0.2% and whose thermal shrinkage factor in a direction perpendicular to that direction is −0.1 to 0.1% when the temperature is raised from 30° C. to 120° C. at a rate of 3° C./min.

4. The biaxially oriented polyester film of claim 1 which is made from polyethylene terephthalate.

5. The biaxially oriented polyester film of claim 1 which is made from polyethylene-2,6-naphthalene dicarboxylate.

6. The biaxially oriented polyester film of claim 1 which has a thickness of 50 to 200 μm.

7. The biaxially oriented polyester film of claim 1 which has a haze value of 5.0% or less.

8. The biaxially oriented- polyester film of claim 1, wherein one side of the film has a surface roughness Ra of 3 to 15 nm.

9. The biaxially oriented polyester film of claim 1, wherein one side of the film has a dynamic friction coefficient of 0.5 or less.

10. The biaxially oriented polyester film of claim 1 which has an amount of curvature of 0 to 5 mm per 1 m of the film length.

11. A base film for a photosensitive material which comprises the biaxially oriented polyester film of claim 1.

12. The base film of claim 11 which is for a photosensitive material of a thermal development system.

13. A process which comprises using the biaxially oriented polyester film of claim 1 as a base film for a photosensitive material.

14. The process of claim 13, wherein the biaxially oriented polyester film is used as a base film for a photosensitive material of a thermal development system.

15. A method of producing a biaxially oriented polyester film whose thermal shrinkage factors satisfy relationships represented by the following expressions (1) to (5) at the same time when it is heated at 120° C. for 20 seconds:

$$0.001 \leqq S_{MD} \leqq 0.1 \quad (1)$$

$$-0.1 \leqq S_{TD} \leqq 0.1 \quad (2)$$

$$-0.05 \leq S_{45} \leq 0.05 \quad (3)$$

$$-0.05 \leq S_{135} \leq 0.05 \quad (4)$$

$$|S_{45} - S_{135}| \leq 0.05 \quad (5)$$

wherein $S_{MD}$ is a thermal shrinkage factor (%) in machine direction of the film under the above conditions, $S_{TD}$ is a thermal shrinkage factor (%) in a direction perpendicular to that direction under the above conditions, and $S_{45}$ and $S_{135}$ are thermal shrinkage factors (%) in a 45° direction and a direction perpendicular to the 45° direction under the above conditions when the machine direction of the film is 0° and a direction perpendicular to that direction is 90°, respectively, the method comprising thermally relaxing at least once a biaxially oriented polyester film whose thermal shrinkage factors do not satisfy at least one of the above expressions (1) to (5) when it is heated at 120° C. for 20 seconds while it is suspended downward by its own weight.

16. The method of claim 15, wherein the biaxially oriented polyester film which does not satisfy at least one of the above expressions (1) to (5) shrinks by 0.01 to 0.4% in machine direction and by −0.1 to 0.1% in a direction perpendicular to that direction when it is heated at 150° C. for 30 minutes.

17. The method of claim 15, wherein the biaxially oriented polyester film which does not satisfy at least one of the above expressions (1) to (5) has a thermal shrinkage factor in machine direction of −0.15 to 0% when the temperature is raised from 30° C. to 120° C. at a rate of 3° C./min.

18. The method of claim 15, wherein thermal relaxation is carried out at a film transfer tension of 1 kPa to 500 kPa.

19. The method of claim 15, wherein thermal relaxation is carried out at a temperature of Tg (the secondary transition temperature (° C.) of a polyester as the raw material of the film) to Tg+140° C.

20. The method of claim 15, wherein the biaxially oriented polyester film is made from polyethylene terephthalate.

21. The method of claim 15, wherein the biaxially oriented polyester film is made from polyethylene-2,6-naphthalene dicarboxylate.

* * * * *